(12) United States Patent
Armstrong

(10) Patent No.: US 6,356,633 B1
(45) Date of Patent: Mar. 12, 2002

(54) ELECTRONIC MAIL MESSAGE PROCESSING AND ROUTING FOR CALL CENTER RESPONSE TO SAME

(75) Inventor: Robert W. Armstrong, Colorado Springs, CO (US)

(73) Assignee: MCI WorldCom, Inc., Washington, DC (US)

( * ) Notice: Subject to any disclaimer, the term of this patent is extended or adjusted under 35 U.S.C. 154(b) by 0 days.

(21) Appl. No.: 09/377,434

(22) Filed: Aug. 19, 1999

(51) Int. Cl.[7] ............................................... G06F 13/00
(52) U.S. Cl. .............................. 379/265.11; 379/265.04; 379/265.09; 379/265.1; 379/309
(58) Field of Search ................................. 379/265, 266, 379/219, 93.15, 93.17, 93.24, 309, 265.04, 265.09, 265.1, 265.11; 709/205, 206, 203

(56) References Cited

U.S. PATENT DOCUMENTS

| | | | | | |
|---|---|---|---|---|---|
| 6,021,428 A | * | 2/2000 | Miloslavsky | ................ | 709/206 |
| 6,044,395 A | * | 3/2000 | Costales | ...................... | 709/206 |
| 6,073,165 A | * | 6/2000 | Narasimhan | ................. | 709/206 |
| 6,128,646 A | * | 10/2000 | Miloslavsky | ................ | 709/206 |
| 6,138,146 A | * | 10/2000 | Moon et al. | ................. | 709/206 |
| 6,141,695 A | * | 10/2000 | Sekiguchi et al. | .......... | 709/246 |
| 6,182,059 B1 | * | 1/2001 | Angotti et al. | ................ | 706/45 |

\* cited by examiner

*Primary Examiner*—Ahmad Matar
*Assistant Examiner*—William J. Deane, Jr.

(57) ABSTRACT

A system and a method are provided for processing and routing electronic mail messages within a call center which include and involve an electronic mail server system for routing incoming and outgoing electronic mail messages and a mail parsing system coupled to the electronic mail server system. The mail parsing system is operative to receive an incoming electronic mail message from the electronic mail server system, to automatically parse the incoming electronic mail message for the existence of at least one predetermined term related to a particular call center activity, and to route the incoming electronic mail message via the electronic mail server system to a corresponding storage area when the incoming electronic mail message contains at least one predetermined term.

38 Claims, 5 Drawing Sheets

ELECTRONIC MAIL MESSAGE PROCESSING AND ROUTING FOR CALL CENTER RESPONSE TO SAME

FIELD OF THE INVENTION

The present invention relates to systems and methods that are used to process and route electronic mail based service requests and inquiries within an automated telephone call response center.

DESCRIPTION OF THE RELATED ART

Electronic mail routing and processing systems, and automated telephone call response systems and centers are well known. Electronic mail (email) has become a widely used vehicle for communicating among individuals inside and outside of large organizations. Unfortunately, however, email has not allowed consumers, for example, to communicate with a customer service center efficiently and effectively without extensive call center operator intervention. That is, unlike telephone calls that may be received by an automated telephone call service center and routed based on caller responses to automated prompts (e.g., "press 1 for sales, 2 for support, etc.), an email message must be manually reviewed, classified, and routed to an appropriate person for appropriate response. As such, although email represents a significant medium for communications, generally, it has not been widely used within call centers due to the labor intensive nature of the processing necessary for generating appropriate response. In a call center, for example, calls received thereby may be routed based on a variety of internal and external control factors. For example, an incoming call to a call center may be routed for live agent response depending on the location of the caller as detected by some form of automatic number identification (ANI) scheme, the destination telephone number as processed through a private branch exchange (PBX) (e.g., the dialed telephone number or dialed number identification string (DNIS)), the competency required for response as determined based on caller responses to automated prompts and entries within an agent skillset database, etc. By utilizing caller responses as "honing" instructions, a call may be routed to a particular agent that is skilled to handle the call and to provide adequate call center response. Such routing is achieved through use of conventional voice response systems in conjunction with computer telephony integration (CTI) systems. Such CTI systems are used to provide call detail data to a live operator via a computer terminal upon the contemporaneous delivery of a telephone call from a caller to that operator and, in particular, to his telephone terminal device (e.g., a headset, etc.).

Unfortunately, once sent an email message is not associated with a caller who is contemporaneously online and ready to respond to automated voice prompts such as those that may be used to otherwise route a telephone call from a caller who is on the call (e.g., one who is on the line and ready to reach a live agent). Instead, an email received by a call center must be read, classified, and manually routed to an agent within an organization who can provide an adequate response. Currently, there exists no way for an email message to be automatically routed based on the nature and content of the message.

Thus, there exists a need to provide systems and methods that may be used to process and route electronic mail messages like telephone calls within an automated telephone call service center. To be viable, such systems and methods must enable call centers to accept electronic mail messages from those individuals and entities seeking call center services (e.g., technical support, product information, etc.) and to respond to such messages after automatically routing the same to ready and able personnel and other response systems.

SUMMARY OF THE INVENTION

The present invention solves the above-described problems associated with generating call center responses to requests and inquiries that originate via communications mediums such as electronic mail, etc. By automating response processes, call centers will be able to better utilize resources including personnel to provide call center responses to e-mail based inquires and requests. In particular, call centers may now respond to electronic mail message based service requests and inquiries without having to manually review and route such messages. In accordance with the present invention and, in particular, its automatic capabilities, electronic mail messages may be treated like or similar to telephone calls by a call center. At the same time, consumers of call center services (e.g., consumers of products and services for which call center support is provided, etc.) will benefit from the present invention by being able to simply create electronic mail based requests that may be sent to a call center address (e.g., a product information inquiry, technical service or support request, etc. in the form of an email message which is sent to an address like or similar to support@MCI.COM, etc.) to be handled automatically and in a timely manner.

To achieve the aforementioned benefits associated with the present invention, the present invention provides systems and methods for processing and routing electronic mail messages within a call center which include and involve an electronic mail server system for routing incoming and outgoing electronic mail messages and a mail parsing system coupled to the electronic mail server system. The mail parsing system is operative to receive an incoming electronic mail message from the electronic mail server system, to automatically parse the incoming electronic mail message for the existence of at least one pre-determined term related to a particular call center activity, and to route the incoming electronic mail message via the electronic mail server system to a corresponding storage area when the incoming electronic mail message contains at least one predetermined term.

According to another aspect of the present invention, a method is provided for obtaining a service from a call center that includes the steps generating an electronic mail message containing a request for a service from a call center which is performed by an electronic mail message origination system, sending the electronic mail message from the electronic mail message origination system to the call center via an electronic data network which couples the electronic mail message origination system and the call center, automatically generating a reply upon receipt of the electronic mail message by the call center, automatically sending the reply to the electronic mail message origination system for routing thereby from the call center via the electronic data network, automatically parsing the electronic mail message for the existence of at least one term related to the service provided by said call center, and routing the electronic mail message to a storage area within said the center when the electronic mail message contains at least one term. The storage area is used to generate a response to the electronic mail message.

The method also includes a step of sending the response from the call center to the electronic mail origination system via the electronic data network.

BRIEF DESCRIPTION OF THE DRAWINGS

The present invention is described in detail below with reference to the following drawing figures, of which.

DETAILED DESCRIPTION OF THE PREFERRED EMBODIMENTS

Figure 1:
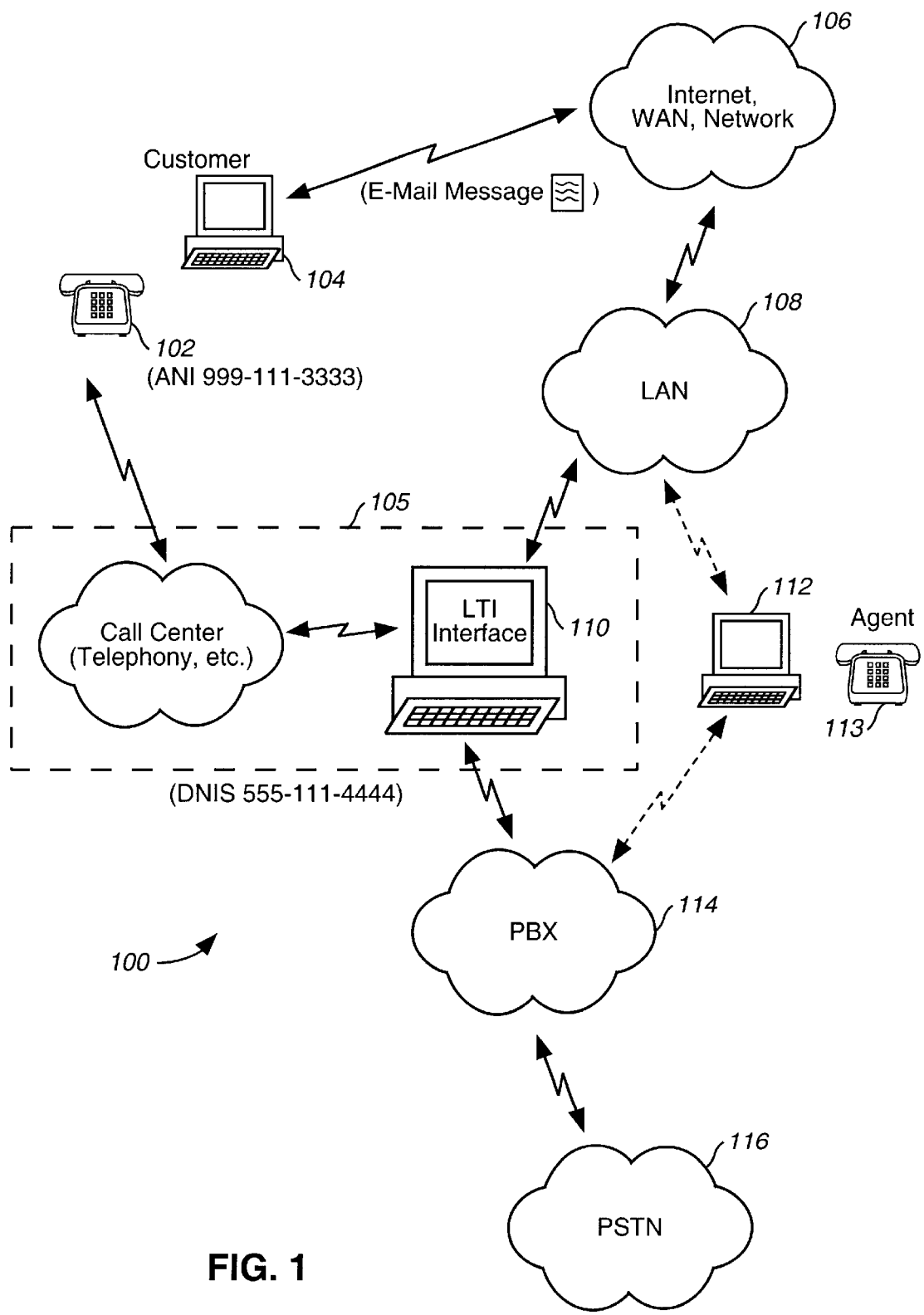
FIG. 1 is a system diagram of a call center system that is equipped to route and process electronic mail based service requests and inquires in accordance with a preferred embodiment of the present invention.

The present invention is now discussed in detail with reference to the drawing figures that were briefly described above. An overview section is followed by a discussion of the structural aspects of the present invention and a discussion of corresponding operations. Unless otherwise indicated, like parts, systems, and processes are referred to with like reference numerals.

OVERVIEW

The present invention is concerned with providing systems and methods that may be used to allow electronic mail messages to be treated like or similar to telephone calls that are routed and processed by a telephone call service center (call center). That is, electronic mail messages received by a call center now may be automatically categorized (e.g., such as customer service, technical support, etc. type messages), parsed for the existence of particular terms (e.g., such as terms related to a particular product or service— "SOFTWARE Version 3.1," "SALES," "SPECIAL OFFER," etc.), and routed (possibly to a live agent) for proper response in relation to a call center activity (e.g., a customer service activity, a technical support activity, etc.). Additionally, automatic response messages may be sent to message creators (e.g., customers seeking customer service, etc.) to inform them that their electronic mail request has been received and will soon be responded to. In terms of routing, the present invention allows the same to occur based on such factors as the content of an electronic mail message (including associated fields and message body), the agent skill set needed for response, etc. Once routed like or similar to a telephone call, a qualified agent may handle the preparation of a response to an electronic mail message as though the content of that message originated via a conventional call center telephone call (e.g., such as one that is normally routed through a compuller-telephony integration system, etc.). The response may take the form of a return electronic email message, a telephone call, acknowledgement of forwarding to another agent, etc. And, since the present invention now allows electronic mail messages to be handled and responded to in a manner similar or like conventional telephone call responses, call center reporting and analysis systems may be used to track electronic mail message statistics such as message volumes, routing times, agent handling times, subject matter of email, etc. Accordingly, the following sections hereof illustrate in detail the novel features and attributes of the present invention that allow electronic mail messages to be received and automatically processed by a modem call center.

STRUCTURAL ASPECTS OF THE PRESENT INVENTION

To deliver the aforementioned functionality and corresponding benefits associated with allowing electronic mail messages to be received and automatically processed by a call center, the present invention embodies a system that includes many structural elements which are now described with reference to FIGS. 1, 2A, 2B, and 2C.

Referring now to FIG. 1, depicted therein is a network data processing system nich includes call center systems that are equipped to route and process electronic bail based service requests in accordance with a preferred embodiment of the present invention. In particular, system 100 includes a customer or calling party having a personal data processing system 104 and one which is equipped to format, send, and retrieve electronic mail messages, as well as to initiate and receive telephone calls via a telephone network such as the publicly switched telephone network (PSTN) 116. Also included within system 100 may be the Internet, a wide area network (WAN) or other network 106, a local area network 108 which may be operated by a telephone call response center (call center), a call center 105 equipped with call center telephony systems including conventional telephony systems and one or more computer-telephony/integration interface systems 110 (discussed in detail below with regard to FIGS. 2A, 2C), an agent or live operator terminal system 112 (a personal data processing system) and other agent communications systems such as telephone terminal stations 113. Additionally, system 100 may include private branch exchange (PBX) telephony based system that may be operated by call-center 105, an organization that has contracted call center services from an entity that manages call center 105 etc.

The interconnections among the component parts shown in FIG. 1 will be readily understood by those skilled in the art. For example, a customer using his personal data processing system 104 may access the Internet via a modem-dial-up connection, a dedicated line connection, or via some other network connection such as via a dedicated ramp to the Internet or other network 106. Additionally, the interconnection between telephony systems of call center 105 and CTI interface systems 110 will be readily understood to be a high-speed data communications link such as a network connection and the like.

In system 100 electronic mail messages (e-mail) may be formatted by and transmitted from personal data processing system 104 via a network connection 106 to call center 105 and, in particular, to an e-mail server system (not shown) within call center 105 to facilitate agent responses thereto in accordance with the present invention. Such operation is described below with regard to FIGS. 3A and 3B. It is important to note that personal data processing system 104 may be part of a larger computing environment such as one that routes e-mail messages through a dedicated electronic mail message server system.

Figure 2A:
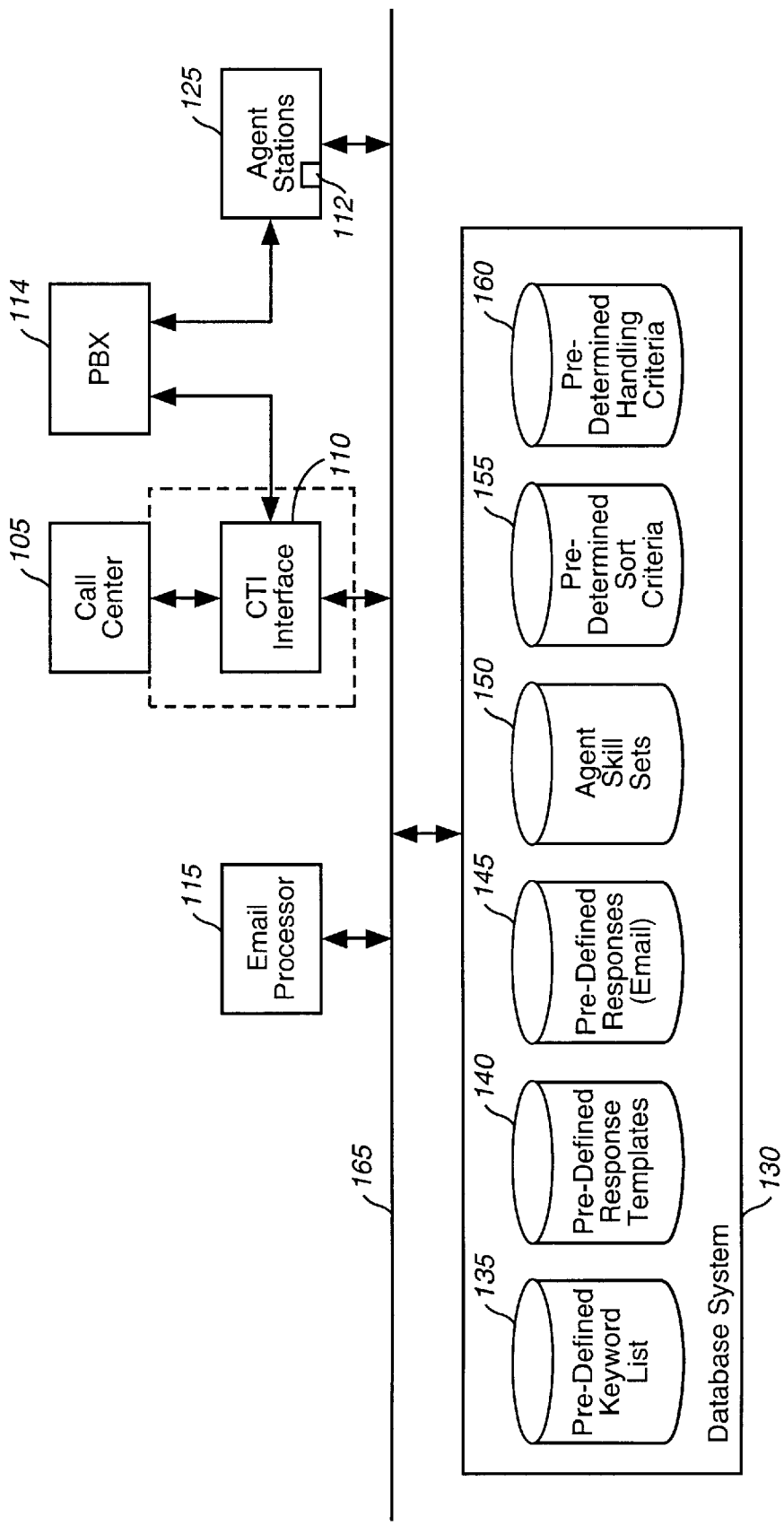
FIG. 2A is block diagram that illustrates structural relationships among the structures shown in FIG. 1.
Figure 2B:
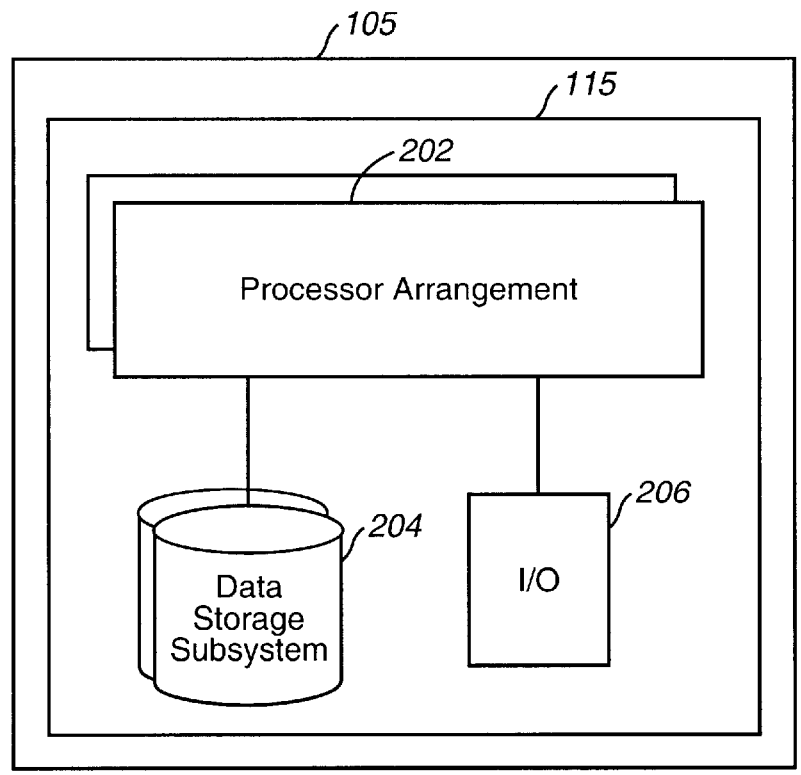
FIG. 2B is a block diagram of a data processing platform used to implement the electronic mail processor shown in FIG. 2A.
Figure 2C:
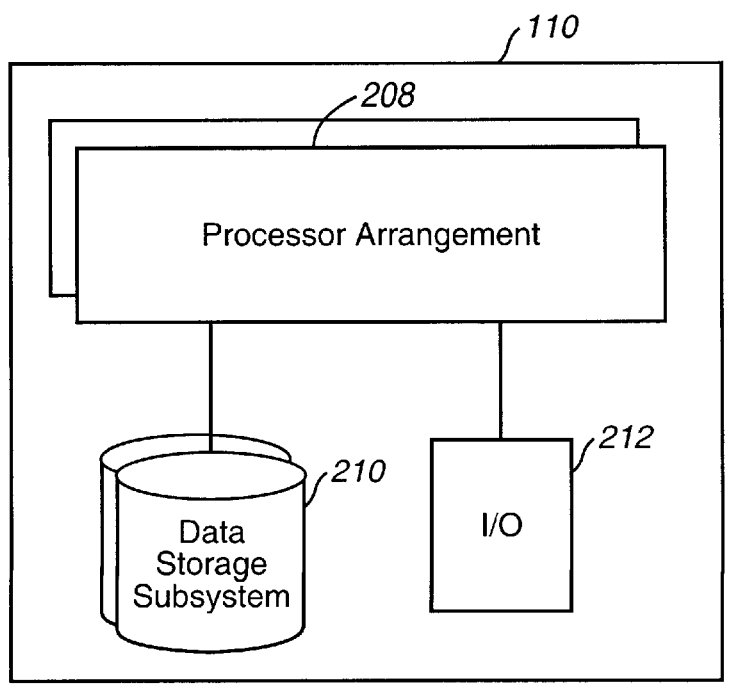
FIG. 2C is a block diagram of a data processing platform used to implement the computer-telephony interface system shown in FIG. 2A.

Referring now to FIGS. 2A, 2B, and 2C, depicted therein are further detailed block diagrams corresponding to system 100. In particular, FIG. 2A illustrates the structural relationships among the elements shown in FIG. 1 and which make up system 100. Network backbone 165 is a data network through which an e-mail processing system 115 communicates with CTI interfaces 110 and agent workstations 125 including agent workstation 112.

Additionally, e-mail processor 115 may access a database system 130 which may be maintained and managed by call center 105 via network backbone 165. Data based system 130 may include databases containing data and information related to predefined keyword lists 135, predefined response templates 140, predefined e-mail responses 145, agent skill sets data 150, predetermined sort criteria 156, predetermined messages handling criteria 160, etc. Keylists 135 can be matched with the content of fields associated with the email, such as the "TO", "FROM", "RE:", date/time created, date/time sent, date/time received, and, of course, the body of the email message itself.

Referring now to FIG. 2B, depicted therein is a block diagram of e-mail processing system 115 as shown within call center 105 as indicated by phantom lines. E-mail processing system 115 may be implemented as a personal data processing system such as one manufactured and marketed by IBM CORPORATION. Accordingly, e-mail processing system 115 includes a processor arrangement 202 including one or more processing elements, a data storage subsystem 204 which may include multiple magnetic disk based systems etc, and an I/O subsystem 206 which may be outfitted with network interface cards, modems, and other data communications peripherals. The arrangement of the structures within e-mail processing system 115 will be readily understood and appreciated by those skilled in the art.

E-mail processing system 115 may be configured to operate in accordance with an operating system such as MICROSOFT WINDOWS NT Version 4.0 which is manufactured and marketed by MICROSOFT CORPORATION. Additionally, e-mail processing system 115 may be configured to operate in accordance with an electronic mail server software package such as POST.OFFICE which is manufactured and marketed by SOFTWARE.COM, MICROSOFT EXCHANGE SERVER which is manufactured by MICROSOFT CORPORATION, or other email processing systems etc. E-mail processing system 115 is configured in accordance with the present invention, to receive route and send electronic mail messages via network connections such as via the Internet, etc. Additionally, e-mail processing system 115 may be outfitted with software modules which parse electronic mail messages in accordance with the present invention for predetermined keywords which may be maintained in predetermined keyword lists 135 as shown in FIG. 2A. Based on such parsing operations, e-mail processing system 115 may be configured to route incoming e-mail messages to particular agents having particular agent skill sets as indicated within agent skill set database 150 as shown in FIG. 2A. Further discussion and details related to such operations are discussed below with regard to FIGS. 3A and 3B. It should also be noted that although such parsing routines and processes may be implemented within e-mail processing system 115, the present invention is not so limited. To the contrary, such parsing modules and/or functionality may be off-loaded to another processor arrangement to deliver such functionality.

Referring now to FIG. 2C, depicted therein is CTI interface system 110. In particular, CTI interfacing system 110 may be implemented using a personal data processing system such as a personal computer like or similar to one manufactured by IBM Corporation. Accordingly, CTI interfacing system 110 may include a processor arrangement 208 including one or more processing elements, a data storage system 210 which may include multiple data storage devices including, but not limited to, multiple magnetic disk drives subsystems. Additionally, CTI processing system includes an I/O subsystem 212 to allow CTI interfacing system to communicate with other structures as illustrated in FIG. 2A and other telephony interface systems.

CTI interfacing system 110 may be configured to operate in accordance with an operating system such as MICROSOFT WINDOWS NT which is manufactured and marketed by MICROSOFT CORPORATION. Additionally, CTI interfacing system 110 should be outfitted with computer software to provide CTI functionality. Such software may include the CT-CONNECT software package which is manufactured and marketed by DIALOGIC CORPORATION.

It is important to note that although CTI interfacing system 110 has been discussed above with regard to a PC based CTI solution, the present invention is not so limited. In particular, CTI interfacing system 110 may be implemented as part of or as an adjunct to PBX system 114 for larger installations. Such an arrangement may also be achieved through products manufactured by DIALOGIC Corporation and in particular the PBX configuration and version of the CT-CONNECT software package as mentioned above.

SYSTEM OPERATION

The structures depicted in FIGS. 1, 2A, 2B, and 2C are configured to operate together to facilitate call center response to e-mail messages as though such e-mail messages were telephone calls received by the call center. The operations which bring about such functionality are illustrated in FIGS. 3A and 3B to which reference is now made.

Figure 3A:
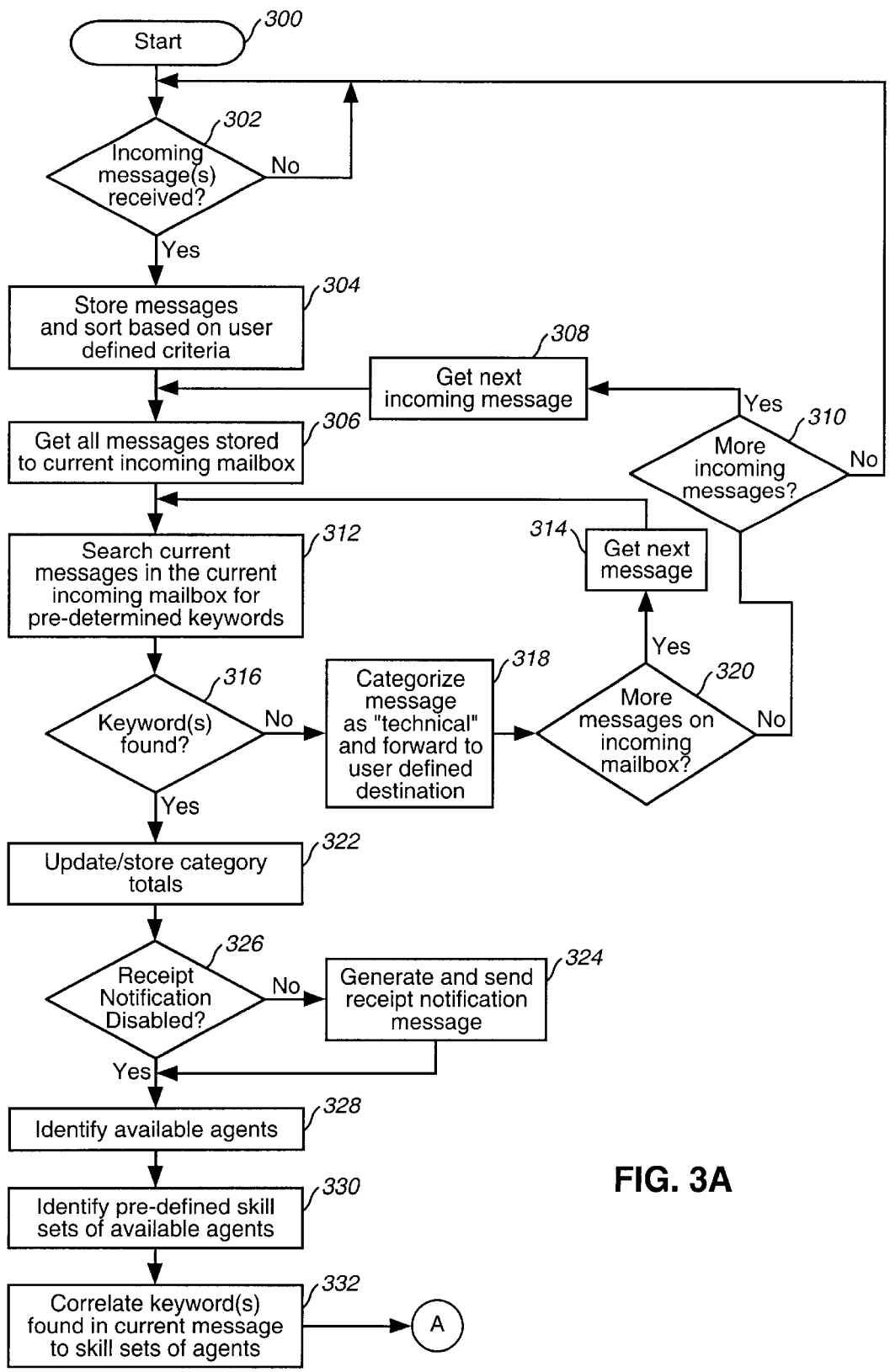
FIG. 3A is a flowchart that illustrates the operations carried out within the system depicted in FIG. 1 to route and process electronic mail messages within a call center environment and to ensure appropriate agent response to the same.
Figure 3B:
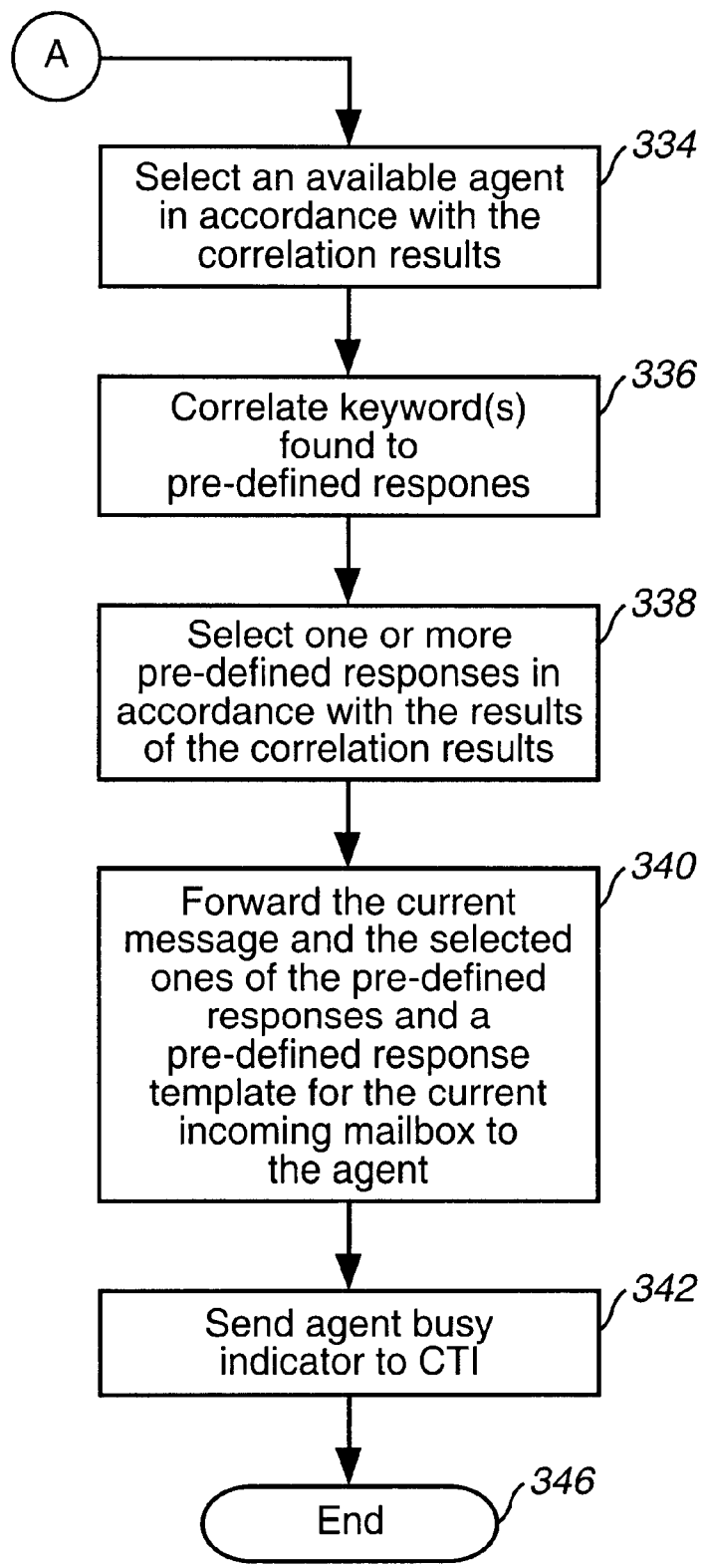
FIG. 3B is a conclusion flowchart of the flowchart started in FIG. 3A.

As depicted by FIG. 3A, processing starts at step 300 and then immediately proceeds to step 302. At step 302, a determination will be made as to whether incoming e-mail messages are received at e-mail processing system 115. If such messages are received, processing proceeds to step 304.

At step 304, e-mail processing system will store messages and sort them based on user defined criteria. Such user-defined criteria may include e-mail originator names, e-mail priorities, receipt times and dates, subject matter of body or subject field, etc. Next, after e-mail messages have been sorted as indicated at step 304, all messages stored (e.g., say 50 to 100 messages) will be transferred at step 306 to a current incoming mailbox. Such an incoming mailbox would be stored within e-mail processing system 115 and in particular data stored within subsystem 204 thereof.

Next, at step 312, e-mail processing system 115 in accordance with appropriate control logic, will search current e-mail messages in the current incoming mailbox for predetermined keywords as defined in predetermined keyword list database 135 as shown in FIG. 2A. Such parsing operations will be readily understood by those skilled in the art of computer programming. Next, at step 316, a determination will be made as to whether predetermined keywords were found within each e-mail message found within the current incoming mailbox. The determination may serve to identify each e-mail message as either a customer service message or a technical support request message or any other appropriate distinction for routing e-mail traffic. The system will search the text of each incoming message for one of the user-defined keywords maintained within predetermined keyword list database 135 (e.g., "SALES," "SOFTWARE," etc). If an e-mail message contains one or more of the keywords, then the system will keep and process the incoming e-mail as a customer service message. The system will automatically forward incoming e-mail that does not contain one of the keywords to a user defined destination address (e.g., a general mailbox, etc.) for handling by technical support personnel. Alternatively, the keyword search made be implemented in the opposite fashion with the keyword search serving to identify the messages which should be auto-forwarded rather than messages to be automatically processed by the system. Accordingly, the system allows users and management personnel within a call center, for example, to define a list of keywords which can be used to identify mail that is not customer service related. Any incoming e-mail message that contains one or more such other keywords should be automatically forwarded to a user defined destination address outside of the call center agent system. Accordingly, records within e-mail processing system 115 should be maintained regarding the number of messages handled in this fashion. And, of course, forwarded e-mail should be deleted from the current incoming mailbox maintained within e-mail processing system 115.

Alternatively, it may be appropriate to keep messages that match particular keywords and automatically forward the messages that do not match such keywords. This will allow a user to define a list of keywords that apply only to customer service, for example, and to forward other e-mail messages that do not contain corresponding keywords.

As such, if no keywords were found at step 316, processing proceeds to step 318 where messages will be categorized as technical service type messages and be forwarded to user defined destinations. Next, at step 320, a looping construct is created by first determining whether additional messages are contained in the current incoming mailbox. If not, processing proceeds to step 310 to determine the existence of additional incoming mailboxes that may contain additional incoming e-mail messages that need to be processed. If not, processing proceeds back to step 302. If additional mailboxes have been created and contain e-mail messages that need to be processed, processing proceeds to step 308 where the next incoming mailbox will be retrieved within e-mail processing system 115 and processing will loop back to step 306 as discussed above.

If, at step 320, additional e-mail messages exist in the current incoming mailbox, processing proceeds to step 314 where the next message will be retrieved from that mailbox and processed. Processing will then proceed back to step 312 as discussed above. If at step 316 keywords were found, processing proceeds to step 322.

At step 322, the system will update and store category totals as mentioned above. Such category totals may be calculated based on analysis of e-mail message subject lines or message body content and, in particular the content thereof which may be parsed and reviewed. Such totals may be stored within data managed by e-mail processing system 115.

Next, at step 326, a determination will made as to whether an internal flag has been set to prohibit or allow automatic e-mail receipt-notification. If automatic e-mail receipt notification has not been disabled, processing proceeds to step 324 where e-mail processing system 115 will generate and send an automatically formatted receipt-notification message back to the originator of a corresponding e-mail message. The receipt-notification message can be modified or automatically sent. For example, after an e-mail message is received by e-mail processing system 115, and sorted and categorized thereby as discussed above, e-mail processing system 115 may send a brief user-defined receipt message back to the e-mail originator to inform the originator that customer service and/or other named department has received the incoming e-mail message and that a response is soon to be generated and sent. Such a response should be an automatic response with the user being able to enable or disable the generation of automatic receipt notifications. In accordance with the present invention, "canned" or pre-defined e-mail responses may be stored within a database such as predefined response database 145 as shown in FIG. 2A. The generation of auto reply e-mail messages will be readily understood by those skilled in the art. Alternately, responses may be defined based on the content of the incoming e-mail message.

If, at step 326, receipt notification has been disabled, processing proceeds to step 328. At step 328, e-mail processing system 115 in conjunction with CTI interfacing system 110 will identify available agents (e.g., human or specifically tailored non-human agents) ready for immediate response of a current e-mail message being processed.

Accordingly, e-mail processing system will notify CTI interfacing system 110 via a corresponding message communicated via network backbone 165 (FIG. 2A) that an incoming e-mail message has arrived and is ready for response by an agent for the call center.

As such, the present invention enables an e-mail message to appear as a traditional telephone call received by a call center. Such a messaging scheme may be consistent with particular vendor products such as the CT-CONNECT software package as discussed above. That is, e-mail messaging system 115 after parsing a message and determining appropriate routing based upon keyword matching, etc, may initiate a message to CTI interfacing system 110 for further routing instructions related to the e-mail message and to a particular agent for appropriate response.

Accordingly, the incoming e-mail messages and other pertinent and/or adjunct data may be routed and delivered to an agent as a package much like a telephone call is delivered with adjunct data by a CTI system within a call center. The messaging between e-mail processing system 115 and CTI interfacing systems 110 will be readily understood as computer-to-computer messages in the networking industry (e.g., packet based messages communicated among computing systems via a communications platform including, but not limited to Internet protocol type communications (TCP/IP), etc.).

Accordingly, at steps 330 and 332, e-mail processing system 115 and CTI interfacing system 110 may access agent skill sets data 150 (FIG. 2A) to determine an appropriate agent based on skill sets related to keywords, etc. for appropriate response to the e-mail message.

Processing proceeds at the top of FIG. 3B.

At step 334, an available agent will be selected in accordance with correlation results determined at step 332. Such correlation results may include an analysis of agent's skill as retrieved from agent skill set data 150 as shown in FIG. 2A.

Accordingly, e-mail received and stored within each incoming mailbox for each category will be sent to available agents based on user-defined skills for each available agent. The system will identify which agents are logged-in and available as well as user-defined skills of those agents.

Additionally, the system will route messages to available agents in a way similar to that a call center automatic call distributor (ACD) routes incoming calls to available agent queues for appropriate response. As such, the system will determine which agents are logged in and available to work. The skill set of each agent is maintained in database 150 (FIG. 2A) and each e-mail message is directed to each agent for handling based on a user defined skill set for each agent. For example, if an agent is able to handle issues for an incoming mailbox known as mailbox A then only mail from such mailboxes should be directed to that agent. If the agent can handle mail coming into any system mailbox then any mail may be sent to that agent.

Next, at step 336, keywords found within an e-mail message that is currently being processed will be correlated or mapped to predefined responses which may be stored within predefined responses database 145 as shown in FIG. 2A. Next, at step 338, one or more predetermined responses will be selected from database 145 in accordance with the results of the correlation results determined at step 336.

Next, at step 340, the current e-mail message being processed and the selected ones of the predefined responses selected from database 145 (FIG. 2A) along with corresponding predefined response templates for the current incoming mailbox will be forwarded to the selected agent for appropriate response by that agent.

Next, an agent busy indicator signal will be sent to CTI interfacing system so that other e-mail messages are not routed to that agent for immediate response when the agent is currently handling an existing e-mail message. Only after the e-mail message has been appropriately handled or further routed by the responsible agent, will the busy indicator be released thus making the agent available within the system for response to additional and future e-mail messages.

Processing ends at step 346.

The systems and processes described above facilitate call center processing of e-mail messages as though such e-mail messages were telephone-type calls received and processed by a computer-telephony integration system within a call center. The present invention achieves such functionality by providing for the routing of e-mail messages based upon keyword matching etc. achieved through e-mail message parsing and the like. Once an e-mail message has been parsed and keywords have been matched, that e-mail message may be routed to an appropriate agent for appropriate processing as though that e-mail message were a telephone call arriving on an agent workstation as typically preformed by a computer telephony integration system. As a result of the present invention, call centers may be outfitted to receive e-mail notifications, store and categorize such e-mail messages, and process the same as though they were telephone calls received at the call center. Customers and consumers can now benefit by simply writing an e-mail message, and sending the same via some form of network connection to an e-mail address corresponding to a call center. In turn, the call center can respond to the e-mail message automatically through use of computer telephony integration systems to route such messages without having to incur additional costs related to resource allocation for what would otherwise be manual review of such e-mail messages. Additionally, call centers may benefit from such systems and processes by ensuring that agent idle time is minimized.

Accordingly, because e-mail messages may now be handled as though they were calls that may be handled by a call center, call center systems can be used to provide statistics and reports related to call volume and activity may be generated based upon e-mail messages received at a call center. Accordingly, management reports may be generated based upon e-mail messages received at the call center and which are responded to by the same. Such reports may include agent-tracking statistics, time upon an agent system, and other such statistics based reports which are well known in the call center industry. For example, reports may be generated related to the average time between e-mail message receipt and response, average message handling time for each subject category, average message handling time per agent within a call center, number of messages exceeding defined handling times, agent availability statistics, number of messages in each incoming mailbox, average handling time for each incoming mailbox, and additional reports to be defined by users prior to system development and deployment in accordance with the present invention.

Thus, having fully described the present invention by way of example with reference to attached drawing figures, it will be readily appreciated that many changes and modifications may be made to the invention and to any of the exemplary embodiments shown and/or described herein without departing from the spirit or scope of the invention, which is defined in the appended claims.

What is claimed is:

1. A system for processing and routing electronic mail messages, comprising:
   an electronic mail server system for routing incoming and outgoing electronic mail messages; and
   a mail parsing system coupled to said electronic mail server system and operative to receive an incoming electronic mail message from said electronic mail server system, to automatically parse said incoming electronic mail message for the existence of at least one term, to select a predefined response based on the at least one term, to identify agents who are ready for immediate response to the message based on whether the agents are logged on and on busy indicators indicating that the agents are currently handling an existing e-mail message, and to route said incoming electronic mail message and said predefined response via said electronic mail server system to a corresponding agent of the identified agents.

2. The system according to claim 1, wherein said system for processing and routing electronic mail messages is located within a call center, said at least one term is related to call center activity, and routing to said corresponding agent includes storing said incoming electronic mail message in a storage area within said call center.

3. The system according to claim 1, wherein said electronic mail server system and said mail parsing system are coupled via an electronic data network.

4. The system according to claim 1, further comprising a keyword database storing at least one pre-configured keyword corresponding to said at least one term and at least one electronic mail address corresponding to said at least one pre-configured keyword, said mail parsing system causing said electronic mail server system to route said incoming electronic mail message based on said at least one electronic mail address.

5. The system according to claim 4, wherein said at least one electronic mail address corresponds to at least one operator within said call center capable of responding to said incoming electronic mail message.

6. The system according to claim 1, further comprising a response statistic system for generating statistics related to a response to said incoming electronic mail message generated by said call center.

7. The system according to claim 6, wherein said statistics include a quantity corresponding to an amount of time before said response to said incoming electronic mail message was generated.

8. The system according to claim 2, wherein said storage area corresponds to a response system to which said electronic mail message is routed based on said at least one term, said response system automatically receiving said incoming electronic mail message and being used to facilitate a response thereto.

9. The system according to claim 8, wherein said response system is an operator terminal coupled to said electronic mail server system and which is configured to receive said incoming electronic mail message.

10. The system according to claim 1, wherein said electronic mail server system automatically replies to said incoming electronic mail message based on a pre-configured response message prior to routing said incoming electronic mail message to said mail parsing system.

11. The system according to claim 1, wherein said call center activity includes responding to a customer service inquiry.

12. A method for processing and routing electronic mail messages within a call center, comprising the following steps:

receiving an incoming electronic mail message;

automatically parsing said incoming electronic mail message for the existence of at least one term related to a call center activity;

selecting a predefined response based on the at least one term;

identifying agents who are ready for immediate response to the message based on whether the agents are logged on and on busy indicators indicating that the agents are currently handling an existing e-mail message; and routing said incoming electronic mail message and said predefined response to a corresponding agent of the identified agents.

13. The method according to claim 12, wherein said receiving, parsing, and routing steps are performed by an electronic mail server and parsing system which is coupled to an electronic data network, said electronic mail message being received by said electronic mail server and parsing system via said electronic data network.

14. The method according to claim 13, wherein said electronic data network is the Internet.

15. The method according to claim 12, wherein said electronic mail server and parsing system further includes a keyword database storing at least one pre-configured keyword corresponding to said at least one term and at least one electronic mail address corresponding to said at least one pre-configured keyword, and said routing step routing said incoming electronic mail message based on said at least one electronic mail address.

16. The method according to claim 15, wherein said at least one electronic mail address corresponds to at least one operator within said call center capable of responding to said incoming electronic mail message.

17. The method according to claim 12, further comprising the steps of generating a response to said incoming electronic mail message, and generating statistics related to the generation of said response to said incoming electronic mail message.

18. The method according to claim 17, wherein said statistics include an amount of time before said response to said incoming electronic mail message was generated.

19. The system according to claim 1, further comprising the step of automatically replying to said incoming electronic mail message based on a pre-configured response message prior to routing said incoming electronic mail message.

20. The system according to claim 1, wherein said call center activity includes responding to a customer service inquiry.

21. A method for obtaining a service from a call center, comprising the following steps:

generating an electronic mail message containing a request for a service from a call center, said generating step being performed by an electronic mail message origination system;

sending said electronic mail message from said electronic mail message origination system to said call center via an electronic data network, said electronic data network coupling said electronic mail message origination system and call center;

automatically generating a reply upon receipt of said electronic mail message by said call center;

automatically sending said reply to said electronic mail message from said call center to said electronic mail message origination system via said electronic data network;

automatically parsing said electronic mail message for the existence of at least one term related to said service provided by said call center;

selecting a predefined response based on the at least one term;

identifying agents who are ready for immediate response to the message based on whether the agents are logged on and on busy indicators indicating that the agents are currently handling an existing e-mail message; and routing said electronic mail message and said predefined response to a corresponding agent of the identified agents.

22. The method according to claim 21, wherein said step of automatically generating said reply is based on a template maintained by said call center.

23. The method according to claim 21, wherein said step of automatically generating said reply includes initiating at least one of a telephone call and a return electronic mail message to an originator of said electronic mail message.

24. The method according to claim 21, wherein said storage area is managed by an agent terminal system within said call center.

25. The method according to claim 21, wherein said routing step is performed by an electronic mail server system.

26. The method according to claim 21, wherein said electronic data network includes the Internet.

27. The method according to claim 21, wherein said service is a customer inquiry response service.

28. The method according to claim 21, wherein said at least one keyword is pre-configured and stored within a database managed by said call center.

29. The method according to claim 21, wherein said at least one keyword is pre-configured based on system attributes related to said electronic mail message origination system.

30. A computer-readable medium having stored thereon a plurality of instructions which when executed by a processor cause said processor to perform steps for processing and routing electronic mail messages within a call center, said steps comprising:

receiving an incoming electronic mail message;

automatically parsing said incoming electronic mail message for the existence of at least one term related to a call center activity;

selecting a predefined response based on the at least one term;

identifying agents who are ready for immediate response to the message based on whether the agents are logged on and on busy indicators indicating that the agents are currently handling an existing e-mail message; and routing said incoming electronic mail message and said predefined response to an agent of the identified agents associated with said at least one term.

31. A method for processing and routing electronic mail messages within a call center, comprising the following steps:

receiving an incoming electronic mail message;

generating a data structure which represents the incoming electronic mail message by automatically parsing said incoming electronic mail message for the existence of at least one term related to a call center activity, comparing said parsed incoming electronic mail message to a keyword in a keyword database to determine if a match exists, selecting a predefined response based on the keyword if it is determined that a match exists, inserting the predefined response into said data structure, and inserting customer contact information from a customer contact information database into said data structure;

determining an association between an agent and said data structure;

identifying the associated agent as ready for immediate response to the message based on whether the agent is logged on and on whether a busy indicator indicates that the agent is currently handling an existing e-mail message; and routing said data structure and said incoming electronic mail message to said associated agent.

32. The method according to claim 31, further comprising generating a reply based on a template maintained by said call center.

33. The method according to claim 32, wherein said step of generating said reply includes initiating at least one of a telephone call and a return electronic mail message to an originator of said electronic mail message.

34. A system according to claim 1, wherein said mail parsing system is farther operative to transmit a busy indicator signal indicating that the corresponding agent is unavailable to work.

35. A method according to claim 12, further comprising transmitting a busy indicator signal indicating that the corresponding agent is unavailable to work.

36. A method according to claim 21, further comprising transmitting a busy indicator signal indicating that the corresponding agent is unavailable to work.

37. A computer-readable medium according to claim 30, the steps further comprising transmitting a busy indicator signal indicating that the associated agent is unavailable to work.

38. A method according to claim 31, further comprising transmitting a busy indicator signal indicating that the associated agent is unavailable to work.

* * * * *